United States Patent

Waldschmidt et al.

[11] Patent Number: 5,415,014
[45] Date of Patent: May 16, 1995

[54] REFRIGERANT RECEIVER TANK ASSEMBLY

[75] Inventors: William L. Waldschmidt, Farmington; William P. Maxwell, Burnsville; Bruce E. McClellan, Richfield, all of Minn.

[73] Assignee: Thermo King Corporation, Minneapolis, Minn.

[21] Appl. No.: 210,861

[22] Filed: Mar. 21, 1994

[51] Int. Cl.6 .............................. F25B 39/04
[52] U.S. Cl. ............................ 62/509; 62/125
[58] Field of Search ............. 62/125, 126, 129, 149, 62/509, 183, 184, 181, 228.3

[56] References Cited

U.S. PATENT DOCUMENTS

| 2,335,694 | 11/1943 | Paquin et al. | 62/509 X |
|---|---|---|---|
| 3,753,356 | 8/1973 | Kramer | 62/125 X |
| 4,707,999 | 11/1987 | Ohta et al. | 62/509 X |
| 5,001,908 | 3/1991 | Mayer | 62/470 |
| 5,222,373 | 6/1993 | Waldschmidt | 62/239 |

FOREIGN PATENT DOCUMENTS

| 807277 | 6/1951 | Germany | 62/509 |
|---|---|---|---|
| 1270504 | 11/1986 | U.S.S.R. | 62/509 |

*Primary Examiner*—Harry B. Tanner

[57] ABSTRACT

A refrigerant receiver tank assembly having a refrigerant inlet flow path for receiving refrigerant from a condenser coil and a refrigerant outlet flow path for supplying refrigerant to an evaporator coil. The receiver tank assembly includes a tank and a manifold which define a closed space for holding a supply level of liquid refrigerant. The refrigerant inlet flow path includes an outlet opening in the closed space, and an inlet opening. The manifold defines the refrigerant outlet flow path, with the refrigerant outlet flow path having an inlet opening in the closed space, and first and second outlet openings. A pick-up tube is disposed in the closed space having a first end connected to the inlet opening of the refrigerant outlet flow path and a second end disposed below the level of liquid refrigerant in the closed space. A controllable valve is mounted on the manifold which selectively controls flow of refrigerant to a predetermined outlet opening of the refrigerant outlet flow path. In a preferred embodiment, an additional tubular member is disposed in the closed space having a first end connected to the refrigerant inlet flow path and a second end disposed above the liquid level the refrigerant. The second end of the pickup tube and the second end of the additional tube are respectively disposed below and above the level of liquid refrigerant in predetermined horizontal and vertical orientations of the receiver tank assembly.

10 Claims, 7 Drawing Sheets

5,415,014

REFRIGERANT RECEIVER TANK ASSEMBLY

TECHNICAL FIELD

The invention relates in general to mechanical refrigeration systems, and more specifically to the construction of a receiver tank assembly suitable for use in a transport refrigeration unit.

BACKGROUND ART

U.S. Pat. No. 5,222,373, which is assigned to the same assignee as the present application, teaches an improvement in the type of transport refrigeration systems having separate condenser and evaporator sections. The condenser section has a support frame which includes a refrigerant compressor, a condenser coil, and a refrigerant receiver, with these components being constructed such that the condenser section may be mounted with the support frame oriented in either a vertical position, such as for mounting the condenser section on a front wall of a truck, or with the support frame oriented in a horizontal position, such as for mounting the condenser section on the roof of a vehicle.

It would be desirable, and it is an object of the invention, to provide a new and improved receiver tank assembly suitable for use in a transport refrigeration system. The new receiver tank assembly should be suitable for use in a transport refrigeration system having separate condenser and evaporator sections, such as the condenser section disclosed in the hereinbefore mentioned U.S. Patent, as well as in a transport refrigeration system having integrated condenser and evaporator sections. It would be desirable, and it is an object of the invention, to substantially reduce the number of components required in such a transport refrigeration system, including reducing the number of component mounting brackets and refrigerant flow tubes or conduits, and reducing the number of tubing accessories such as tees, elbows and reducing bushings, thus reducing the number of solder joints, to reduce manufacturing time and cost of the associated transport refrigeration system, as well as the time to service and trouble shoot the transport refrigeration system.

It would also be desirable, and it is another object of the invention, to provide a new and improved refrigerant receiver tank assembly which maintains the ability of an associated condenser section to be mounted vertically on a wall of a vehicle, or horizontally on the roof of a vehicle, even when vertical mounting places an input header or manifold of the refrigerant receiver assembly below a receiver tank portion of the refrigerant receiver tank assembly.

SUMMARY OF THE INVENTION

Briefly, the invention is an improved refrigerant receiver tank assembly for receiving liquid refrigerant from a refrigerant condenser and for supplying liquid refrigerant to a refrigerant evaporator. The receiver tank assembly includes a receiver tank and a receiver manifold which define a closed space for containing a supply level of liquid refrigerant. The receiver manifold defines a refrigerant outlet flow path having an inlet opening in fluid flow communication with the closed space and first and second outlet openings. Pick-up tube means is disposed in the closed space having a first end connected to the inlet opening of the refrigerant outlet flow path and a second end disposed in fluid flow communication with liquid refrigerant in the closed space. Electrically controlled valve means is mounted on the receiver manifold in fluid flow communication with the refrigerant outlet flow path. The electrically controlled valve means selectively controls flow of refrigerant to a predetermined outlet opening of the refrigerant outlet flow path. Desirable embodiments of the invention use the receiver manifold and/or the receiver tank to mount a plurality of additional control devices, eliminating separate conduits, fittings, solder joints, and the like.

In a preferred embodiment of the invention the receiver tank assembly is constructed to enable it to be associated with a condenser section which is alternatively vertically mountable on a wall of a vehicle, or horizontally mountable on a roof of a vehicle. The construction of the receiver tank assembly specifically permits vertical mounting of an associated condenser section to place a manifold of the refrigerant receiver tank assembly below a receiver tank portion of the refrigerant receiver tank assembly. This is accomplished by employing first and second tubular members in the closed space defined by the refrigerant receiver tank, eg., the hereinbefore mentioned pick-up tube means and additional tube means. The refrigerant receiver tank has first and second ends and a longitudinal axis which extends between the first and second ends. The additional tube means has first and second ends, with the first end being connected in fluid flow communication with the outlet opening of the refrigerant inlet flow path. The pick-up tube means and the additional tube means have predetermined different configurations selected to place the second end of the additional tube means above the level of liquid refrigerant in the receiver tank, and the second end of the pick-up tube means below the level of the liquid refrigerant, when the longitudinal axis of the receiver tank is oriented vertically and also when the longitudinal axis of the receiver tank is mounted horizontally.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Certain aspects of the refrigerant receiver tank assembly are applicable to transport refrigeration systems having integrated condenser and evaporator sections. The refrigerant receiver tank of the invention, however, is particularly useful with transport refrigeration systems having separate condenser and evaporator sections. Thus, the refrigerant receiver tank of the invention will be described relative to a transport refrigeration system having separate condenser and evaporator sections, such as described in the hereinbefore mentioned U.S. Pat. No. 5,222,373. Components and descriptions thereof which may be the same as described in detail in U.S. Pat. No. 5,222,373, and not necessary for the understanding of the invention, will not be shown and described again. U.S. Pat. No. 5,222,373 is hereby incorporated into the specification of the present application by reference.

Figure 1:
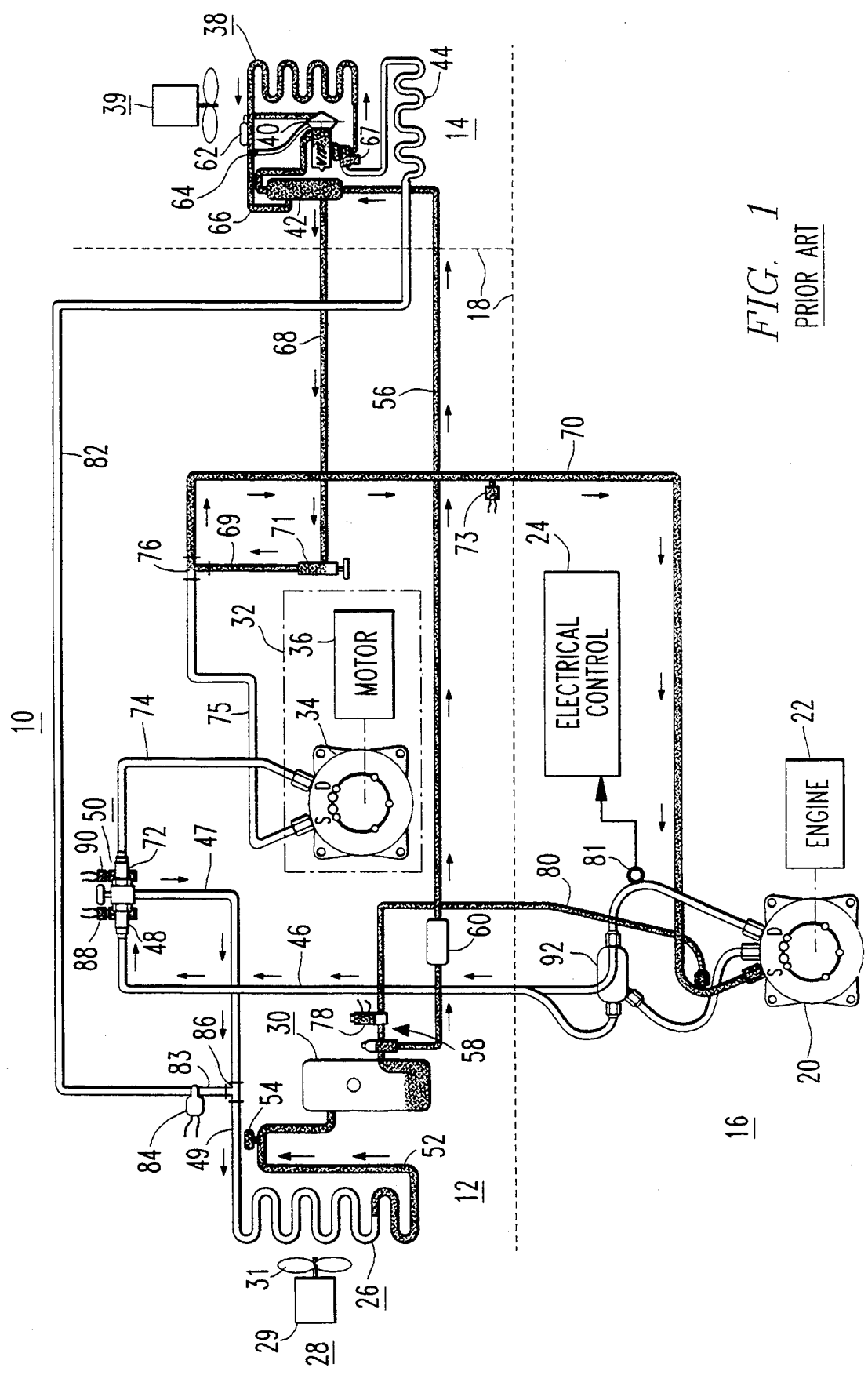
FIG. 1 is a schematic piping diagram of a prior art transport refrigeration system having separate condenser, evaporator, and truck engine sections.

Referring now to the drawings, and to FIG. 1 in particular, there is shown a schematic piping diagram of a prior art transport refrigeration system 10 having separate condenser, evaporator, and vehicle engine sections 12, 14 and 16, respectively, separated by broken line 18.

The vehicle engine section 16 includes a refrigerant compressor 20 driven by a vehicle engine 22, and electrical control 24.

The condenser section 12 includes a condenser coil 26; condenser air mover means 28, such as air mover means having an electric drive motor 29 and a fan 31, for example; a receiver tank assembly 30; and, optional power pack apparatus 32 comprising a stand-by refrigerant compressor 34 driven by an electric motor 36. Transport refrigeration system 10 is operated by refrigerant compressor 20 while vehicle engine 22 is operating. When optional power pack apparatus 32 is incorporated into transport refrigeration system 10, stand-by refrigerant compressor 34 operates transport refrigeration system while vehicle engine 22 is off and the associated vehicle is parked adjacent to a source of electrical potential for operating electric drive motor 29.

The evaporator section 14 includes an evaporator coil 38, evaporator air mover means 39, an expansion valve 40, such as a thermostatic expansion valve, a heat exchanger 42 and a defrost pan heater 44.

Figure 2:
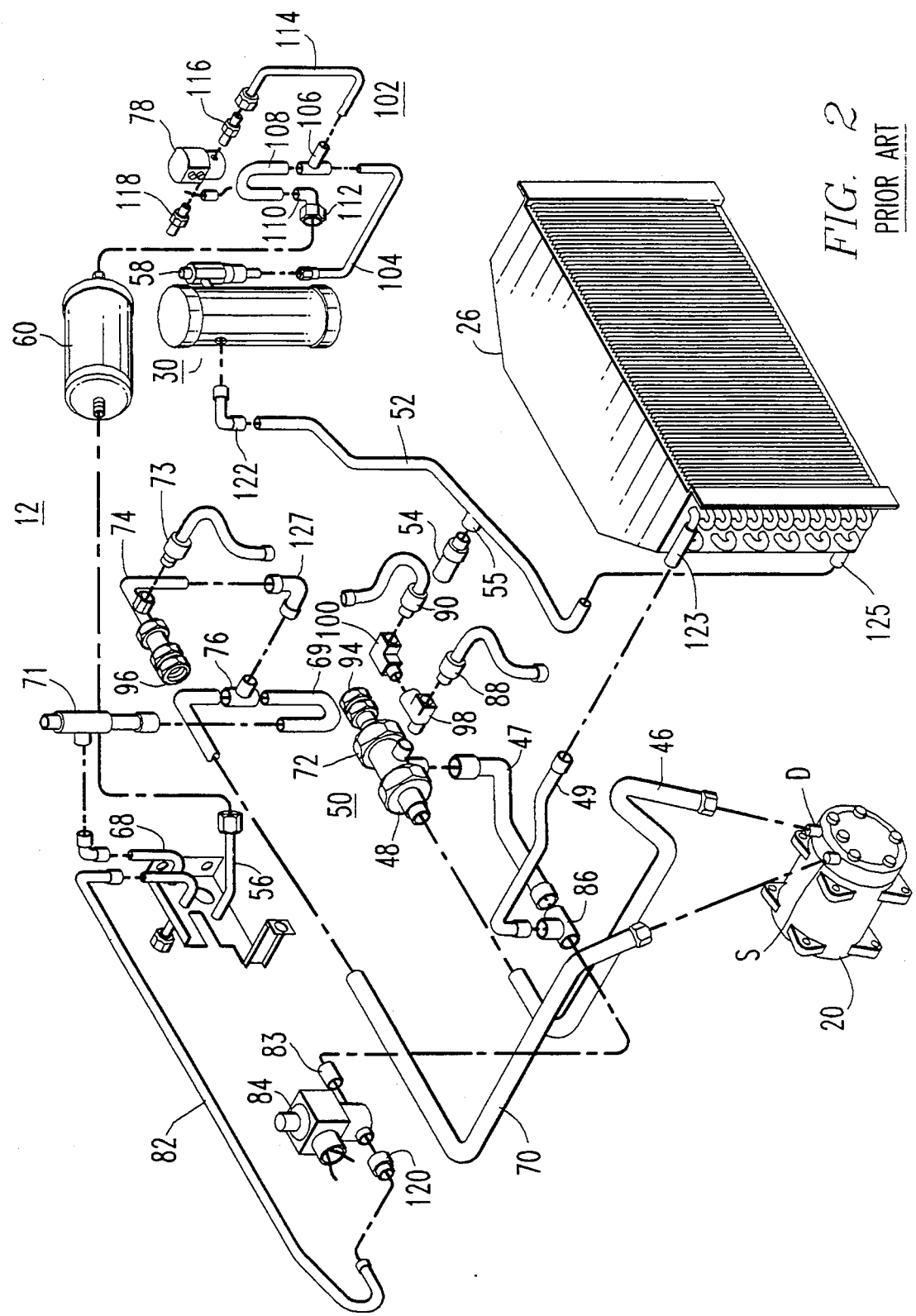
FIG. 2 is an exploded piping diagram illustrating refrigerant flow tubes, tees, elbows, valves, and the like, of a prior art implementation of the condenser section shown in FIG. 1.

A discharge port D of refrigerant compressor 20 is connected to an inlet opening of condenser coil 26 via hot gas lines 46, 47 and 49, and a first compressor discharge check valve 48, of a double discharge check valve assembly 50. The double discharge check valve assembly 50 is required only when optional power pack apparatus 32 is incorporated into transport refrigeration system 10. Hot gas line 46 is connected to an inlet opening of check valve 48, hot gas line 47 has one end connected to a common outlet opening of double check valve assembly 50, and hot gas lines 47 and 49 continue the flow of hot refrigerant gas to an inlet header of condenser coil 26. An outlet header of condenser coil 26 is connected to an inlet opening of receiver tank assembly 30 via a conduit 52 which includes a high pressure relief valve 54 and a valve mounting fitting 55 (FIG. 2).

An outlet opening of receiver tank assembly 30 is connected to an inlet opening of a first section of heat exchanger 42 via a liquid line 56 which includes a receiver outlet valve 58 and a refrigerant dryer 60. An outlet opening of the first section of heat exchanger 42 is connected to an inlet opening of expansion valve 40. Expansion valve 40 is controlled by temperature and pressure sensors 62 and 64, respectively, disposed at an outlet conduit 66 of evaporator coil 38.

An outlet opening of expansion valve 40 is connected to a refrigerant distributor 67 which distributes refrigerant into an inlet header of evaporator coil 38. Evaporator coil outlet conduit 66 is connected to an inlet opening of a second section of heat exchanger 42, and an outlet opening of the second section of heat exchanger 42 is connected to a suction port S of refrigerant compressor 20 via suction line conduits 68, 69, and 70 which include a suction pressure regulator 71 and a low pressure cut-out switch 73 having contacts connected to electrical control 24.

Power pack apparatus 32, when incorporated into transport refrigeration system 10, connects a discharge port D of stand-by refrigerant compressor 34 to hot gas line 46 via a second discharge check valve 72 of double discharge check valve assembly 50, and a hot gas line 74. A suction port S of stand-by compressor 34 is connected to suction line 68 via a suction line 75 and a tee 76.

A liquid refrigerant injection solenoid valve 78 connects an outlet opening, located downstream from receiver outlet valve 58, to refrigerant compressor 20 via a conduit 80. Conduit 80 may be connected to a metering port of refrigerant compressor 20, or to the suction port S, as illustrated. When the temperature of refrigerant compressor 20 reaches a predetermined elevated temperature, as sensed by a temperature sensor 81 located to sense the temperature of refrigerant compressor 20, such as the temperature of hot gas line 46 at a point close to discharge port D of refrigerant compressor 20, electrical control 24 opens liquid refrigeration injection solenoid valve 78 to expand a controlled amount of liquid refrigerant in refrigerant compressor 20, thereby cooling it.

Defrosting of evaporator coil 38 is provided by hot gas line conduits 82 and 83 and a hot gas solenoid valve 84. Conduit 83 has one end connected between hot gas lines 47 and 49 via a tee 86 and the remaining end is connected to hot gas solenoid valve 84. Hot gas line conduit 82 has one end connected to hot gas solenoid valve 84 and the remaining end is connected to an inlet opening of defrost pan heater 44. An outlet opening of defrost pan heater 44 is connected to refrigerant distributor 67. Means for detecting a need to defrost evaporator coil 38, such as a defrost timer disposed in electrical control 24, or any other type of defrost sensor, results in electrical control 24 opening hot gas solenoid valve 84 for a period of time necessary to melt frost and ice build-up on evaporator coil 38 via hot refrigerant vapor.

A high compressor pressure cut-out switch 88 and a condenser fan control switch 90, both of which have electrical contacts connected to electrical control 24, are both disposed to sense the discharge pressure of the operative refrigerant compressor 20 or 34, such as by sensing the compressor discharge pressure at the double discharge check valve assembly 50, as illustrated. High pressure cut-out switch 88 protects the operative refrigerant compressor from excessive pressure, by cutting out the operative refrigerant compressor. Condenser fan control switch 90 controls the energization and de-energization of condenser air mover means 28.

Drops of compressor lubricant oil entrained in the hot refrigerant vapor output of compressor 20 may be separated from hot refrigerant vapor in hot gas line 46 via an oil separator 92 which returns the separated oil to an oil sump of refrigerant compressor 20.

Figure 3:
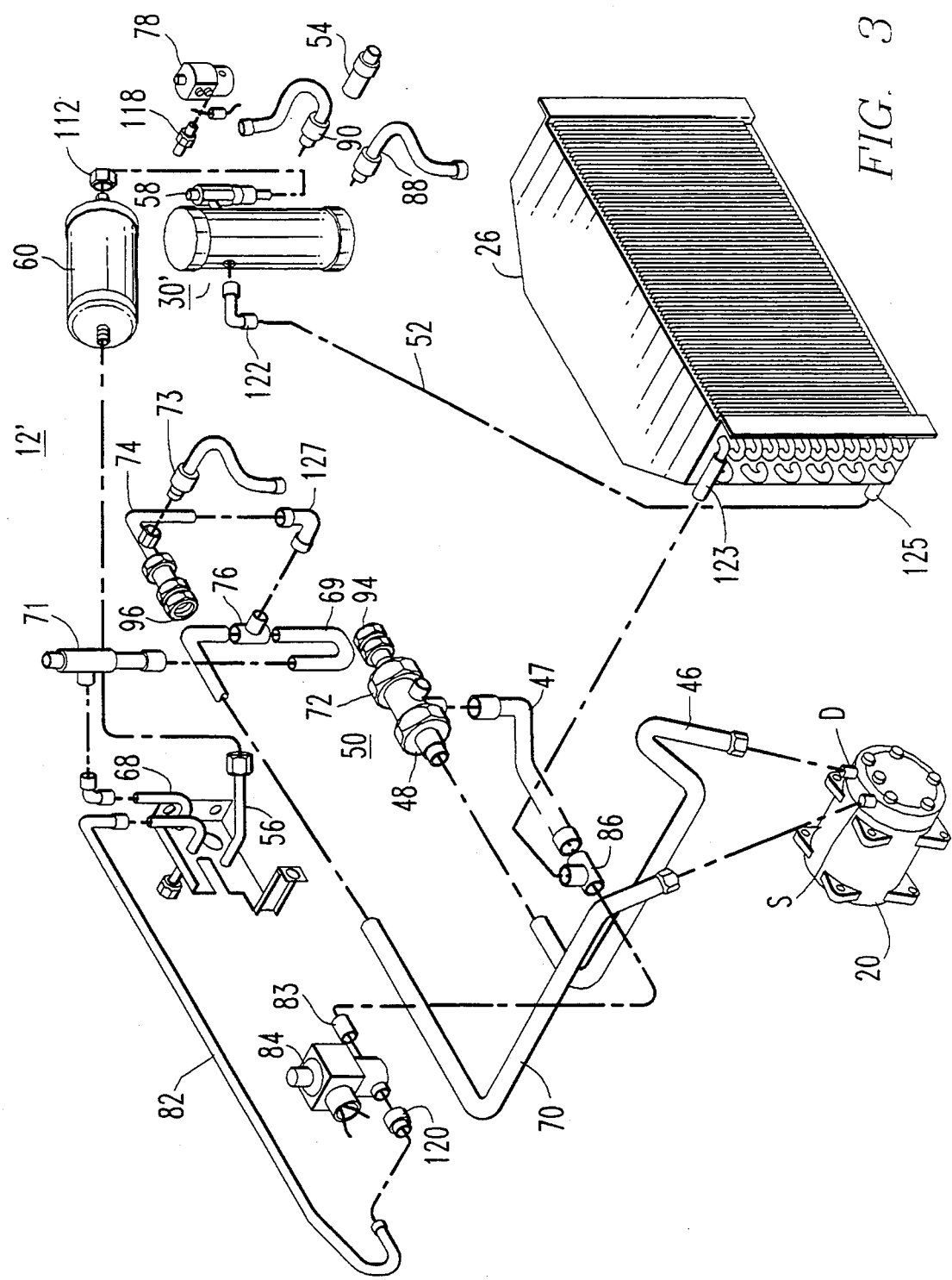
FIG. 3 is an exploded piping diagram illustrating refrigerant flow tubes, tees, elbows, valves, and the like, of a condenser section having a refrigerant receiver tank assembly constructed according to the teachings of the invention.

FIG. 2 is an exploded piping diagram illustrating refrigerant flow tubes, tees, elbows, valves, and the like, of a prior art implementation of the condenser section 12 shown in FIG. 1, and FIG. 3 is an exploded piping diagram illustrating refrigerant flow tubes, tees, elbows, valves, and the like, of a condenser section 12' which is similar to the condenser section 12 of FIG. 2, except FIG. 3 eliminates piping conduits and associated hardware which are not required when refrigerant receiver tank assembly 30 is constructed according to the teachings of the invention. Like components in FIGS. 1, 2 and 3 are identified with like reference numbers.

Referring first to FIG. 2, components utilized in the prior art implementation, but not shown in FIG. 1, include O-ring seal (ORS) fittings 94 and 96 to which the discharge and suction ports D and S of stand-by refrigerant compressor 34 are respectively connected; first and second switch mounting fittings 98 and 100 for respectively mounting electrical switches 88 and 90 to double check valve assembly 50; a piping assembly 102 at an output side of receiver tank assembly 30 which includes a conduit 104, a tee 106, a conduit 108, an elbow 110, an ORS fitting 112, a conduit 114, and fittings 116 and 118, with fitting 118 connecting liquid refrigerant injection solenoid valve 78 to conduit 80, which is not shown in FIG. 2; a reducing bushing 120 disposed between hot gas line conduit 82 and hot gas solenoid valve 84; an elbow 122 connected between conduit 52 and receiver tank assembly 30; inlet and outlet header connectors 123 and 125 associated with condenser coil 26; and, an elbow 127 which connects tee 76 to hot gas line 74.

Figure 4:
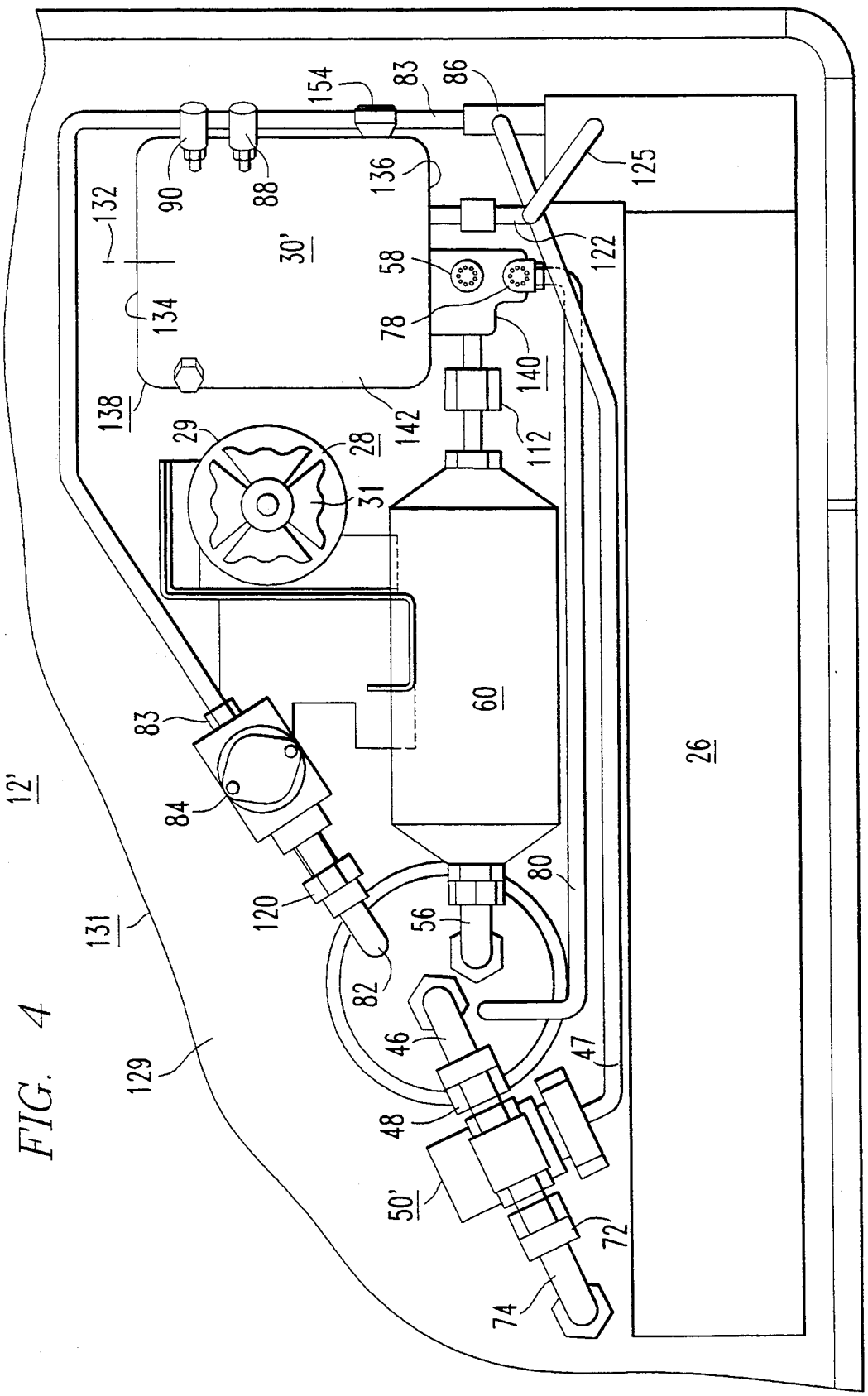
FIG. 4 is a fragmentary view of a condenser section having a refrigerant receiver tank assembly constructed according to the teachings of the invention, with FIG. 4 being an elevational view of the condenser section when a support frame of the section is mounted on a vertical surface, and a plan view when the support frame of the section is mounted on a horizontal surface.

FIG. 4 illustrates an assembled condenser section 12', shown exploded in FIG. 3, with FIG. 4 additionally having a refrigerant receiver tank assembly 30' constructed according to the teachings of the invention. The optional power pack apparatus 32 is not shown in FIG. 4, as whether or not optional power pack apparatus 32 is incorporated into transport refrigeration system 10 is immaterial to the present invention. The refrigerant receiver tank assembly 30' of the present invention is applicable to transport refrigeration systems which have, and which do not have, auxiliary power pack apparatus 32. A double check valve assembly 50' is illustrated, however, so that optional power pack apparatus 32 may be incorporated.

FIG. 4 is a front elevational view of condenser section 12' when condenser section 12' is mounted on a vertically oriented surface of a wall of an associated vehicle, and a plan view of condenser section 12' when condenser section 12' is mounted on a horizontally oriented surface of a roof of an associated vehicle. The components of condenser section 12' are mounted on a relatively flat pan 129 of a metallic support frame 131. Metallic support frame 131 is suitable for mounting on a vertically oriented wall surface, or a horizontally oriented roof surface, of a vehicle.

The piping complexity, manufacturing time and cost, and maintenance time of condenser section 12', are substantially reduced by constructing refrigerant receiver tank assembly 30' according to the teachings of the invention. Receiver tank assembly 30' has a longitudinal axis 132 which extends between first and second longitudinal ends 134 and 136 of receiver tank assembly 30' Receiver tank assembly 30' has a tank portion 138 and a header or manifold portion 140, hereinafter called tank 138 and manifold 140.

Figure 5:
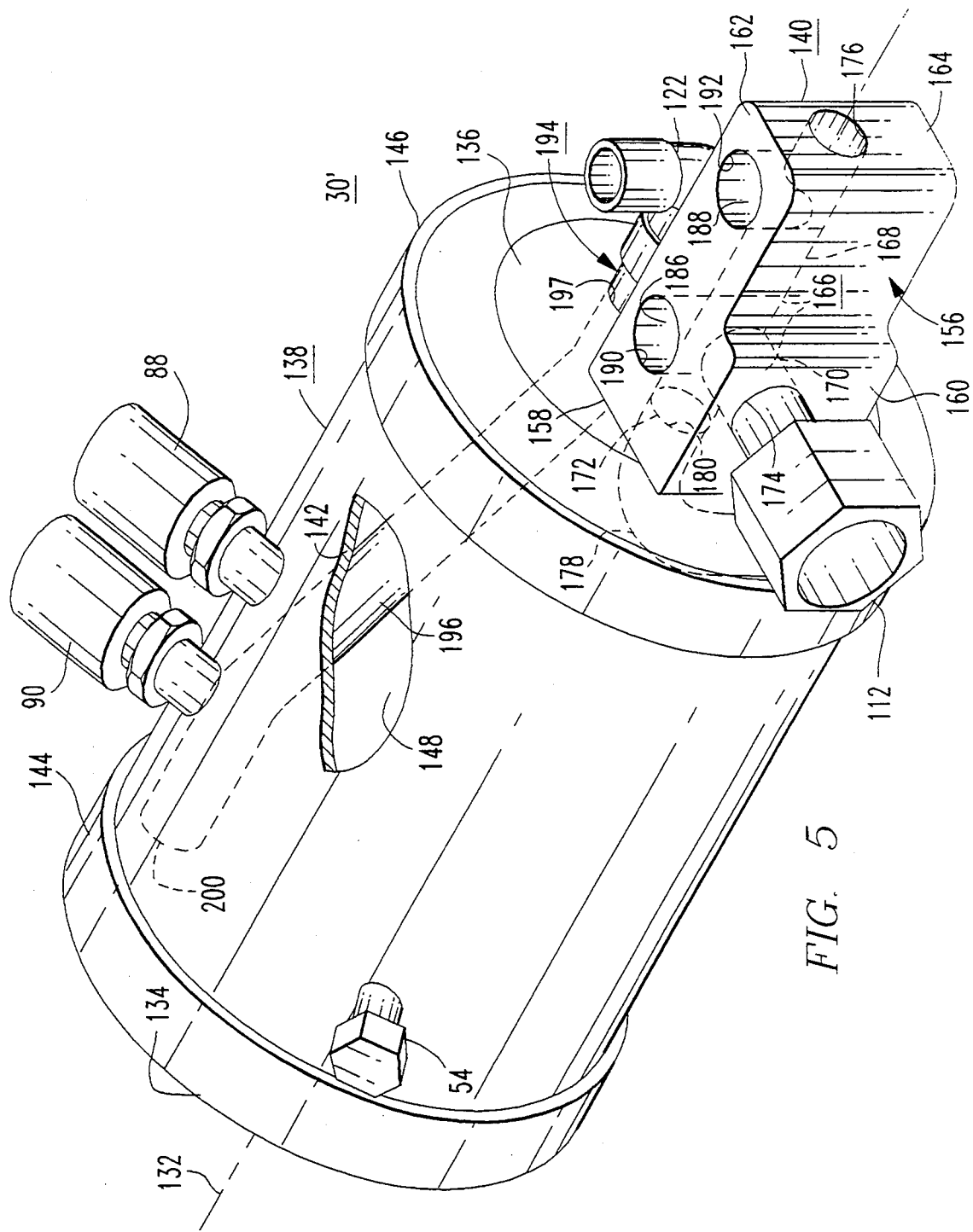
FIG. 5 is a perspective view of a preferred embodiment of the receiver tank assembly shown in FIG. 4.
Figure 6:
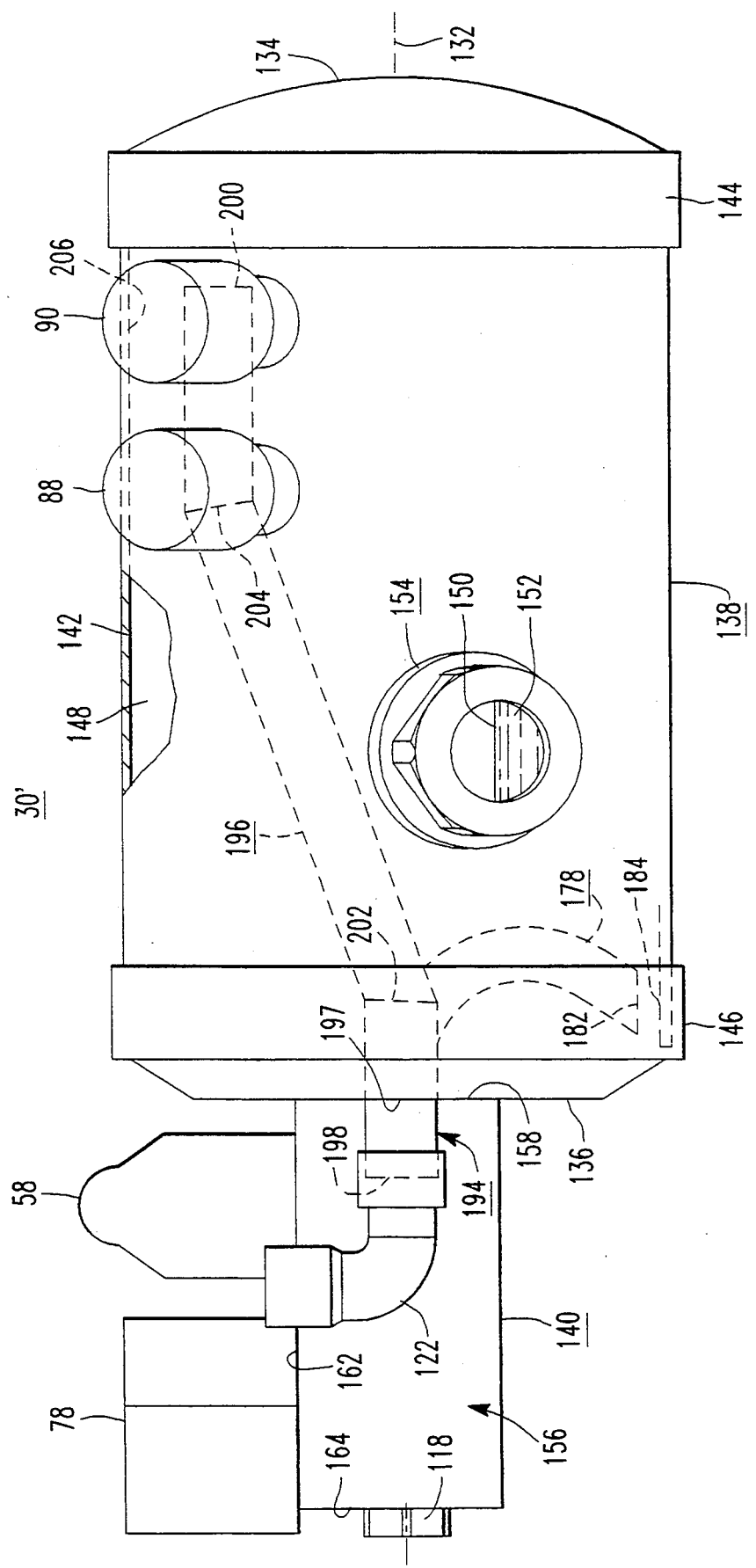
FIG. 6 is an elevational view of the receiver tank assembly shown in FIG. 5, with a longitudinal axis of the receiver tank assembly being horizontally oriented.
Figure 7:
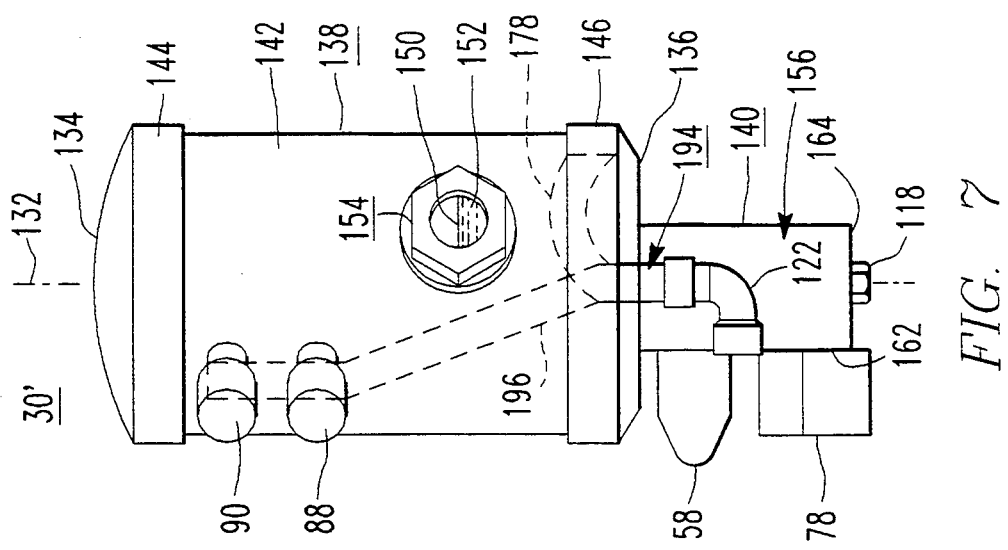
FIG. 7 is an elevational view of the receiver tank assembly shown in FIG. 5, with a longitudinal axis of the receiver tank assembly being vertically oriented.
Figure 8:
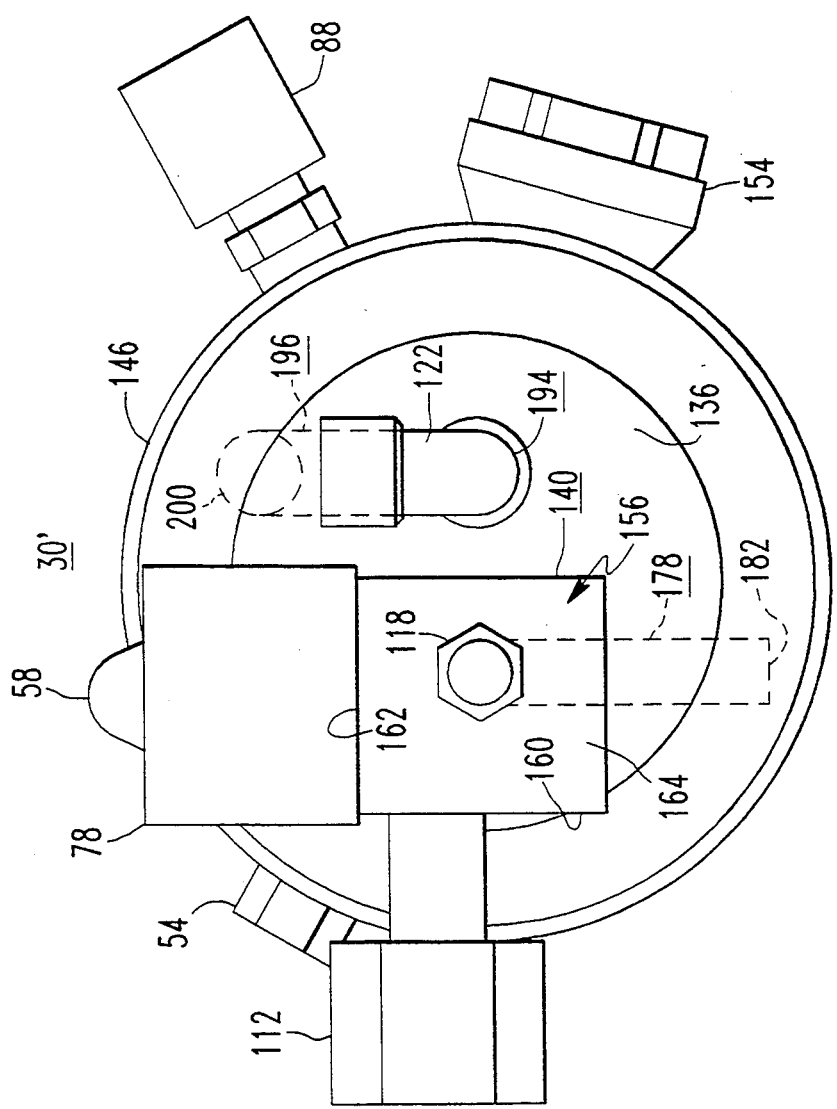
FIG. 8 is a view of a receiver manifold end of the receiver tank assembly shown in FIGS. 5, 6, and 7, with FIG. 8 being an elevational view of the FIG. 6 orientation in which a longitudinal axis of the receiver tank assembly is horizontally oriented, and a bottom view of the FIG. 7 orientation in which the longitudinal axis is vertically oriented.

In describing receiver tank assembly 30' of FIG. 4, FIGS. 5 through 8 will also be described. FIG. 5 is a perspective view of the receiver tank assembly 30' shown in FIG. 4. FIG. 6 is an elevational view of the receiver tank assembly 30' shown in FIG. 5, with longitudinal axis 132 being horizontally oriented. FIG. 7 is an elevational view of receiver tank assembly 30' with longitudinal axis 132 being vertically oriented. FIG. 8 is a view of the receiver tank assembly 30' 132 shown in FIGS. 5, 6 and 7, with the view being an elevational end view when longitudinal axis 132 is horizontally oriented, and a bottom view when longitudinal axis 132 is vertically oriented.

Receiver tank 138, which may be cylindrical and formed of a metal, such as steel, includes a side wall portion 142, and first and second end caps 144 and 146, respectively, which define a closed space 148 which holds a supply level 150 of liquid refrigerant 152 delivered to receiver tank assembly 30' by condenser coil 26.

A sight glass 154 is sealingly mounted in an opening in side wall portion 142 of tank 138. Sight glass 154 is located such that it will indicate the level 150 of liquid refrigerant 152 when tank 138 is mounted with longitudinal axis 132 horizontally oriented, as shown in FIG. 6, and when tank 138 is mounted with longitudinal axis 132 vertically oriented, as shown in FIG. 7.

Receiver manifold 140 is formed of a metallic block member 156, such as steel, with metallic block member 156 being used as a mounting support for certain control components of condenser section 12', as well as defining bores or passageways which serve as conduits between the components mounted thereon. More specifically, metallic block member 156 serves as mounting support for receiver outlet valve 58, liquid injection solenoid valve 78, fitting 118, inlet elbow 122, and ORS fitting 112.

High pressure relief valve 54, high pressure cutout switch 88, and condenser fan control switch 90 are mounted on receiver tank assembly 30', to sense the pressure within closed space 148. These devices may be mounted on the metallic block member 156, in pressure relation with bores formed in metallic block member 156 which communicate with closed space 148; or, as illustrated in FIGS. 4 through 8, these devices are preferably mounted on tank 138, such as in openings formed in side wall portion 142 of tank 138.

The hereinbefore described component mounting arrangements which utilize tank 138 and manifold 140 as component support members, eliminate conduit 52, as output header 125 of condenser coil 26 is fixed directly to elbow 122; it eliminates fitting 55 for high pressure relief valve 54; it eliminates fittings 98 and 100 for mounting high pressure cut-out switch 88 and condenser fan control switch 90; and, it eliminates most of the components of piping assembly 102, including conduit 104, tee 106, conduit 114 and fitting 116. Elimination of these components results in the clean, uncluttered open appearance of condenser section 12', as clearly illustrated in FIG. 4. Hot gas line conduit 49 is also eliminated, as tee 86 is connected directly to inlet header connector 123 of condenser coil 26.

As shown most clearly in FIG. 5, which illustrates certain openings in metallic block member 156 without components mounted therein for purposes of clarity, metallic block member 156 has bores or passageways therein which extend between openings disposed in certain surfaces of metallic block member 156. The predetermined surfaces of metallic block member 156 include first, second, third and fourth surfaces 158, 160, 162 and 164, respectively. The first surface 158 is disposed against the second end cap 146.

A refrigerant outlet flow path 166 through metallic block member 156 extends from the first surface 158 to external surfaces 160 and 164. Refrigerant outlet flow path 166 is provided by a bore 168 which extends between the first and fourth surfaces 158 and 164 of metallic block member 156, and by a bore 170 which starts at the second surface 160 and which intersects bore 168 within metallic block member 156 to define a continuous refrigerant outlet flow path having an inlet opening 172 in fluid flow communication with closed space 148 via an opening in end cap 146, a first outlet opening 174 in surface 160, and a second outlet opening 176 in surface 164. ORS fitting 112 is fixed in the first outlet opening 174, and fitting 118 is fixed in the second outlet opening 176. A preferably metallic first tubular member 178, also called pick-up tube 178, is disposed within closed space 148. The first tubular member 178 has first and second ends 180 and 182, respectively, with the first end 180 being fixed in inlet opening 172, and with the second end 182 being disposed in closely spaced relation with an inner surface 184 of closed space 148.

In addition to bores 168 and 170 which define the refrigeration outlet flow path 166, metallic block member 156 has first and second additional bores 186 and 188. The first additional bore 186 extends inwardly from surface 162 of metallic block member 156 to intersect the refrigerant outlet flow path 166, such as at the intersection of bores 168 and 170. The first additional bore 186 defines an opening 190 in surface 162, and the receiver outlet valve 58 is mounted therein. Manual operation of receiver outlet valve 58 selectively opens and closes, the refrigerant outlet flow path 166 to both the first and second outlet openings 174 and 176.

The second additional bore 188 extends inwardly from surface 162 of metallic block member 156 to intersect the refrigerant outlet flow path 166, downstream from the location of receiver outlet valve 58, between the receiver outlet valve 58 and opening 176 in surface 164. Bore 188 defines an opening 192 in surface 162 in which the solenoid operated liquid injection valve 78 is disposed. Electrical operation of solenoid operated valve 78 opens and closes bore 168, selectively providing cooling for refrigerant compressor 20, when required, as determined by temperature sensor 81.

A refrigerant inlet flow path 194 may proceed through an additional bore in metallic block member 156; or, as illustrated in the Figures, the refrigerant inlet flow path 194 preferably proceeds through an opening 197 disposed in the second end cap 146. A second metallic tubular member 196 having first and second ends 198 and 200, respectively, is disposed in opening 197. The first end 198 of the second tubular member 196 functions as an inlet opening of the refrigerant inlet flow path 194, and is located outside closed space 148. The inlet elbow 122 is fixed to the first end 198. The second end 200 of the second tubular member 196 is disposed within closed space 148 and it functions as an outlet opening of the inlet flow path 194.

The first and second tubular members 178 and 196, which are disposed substantially within closed space 148, each have predetermined configurations which enable receiver tank assembly 30' to function efficiently with longitudinal axis 132 horizontally oriented, as shown in FIG. 6, and vertically oriented, as shown in FIG. 7, with receiver tank manifold 140 being below tank 138 in the vertical orientation of FIG. 7.

The configuration of the second tubular member 196 is selected such that the second end 200 thereof is above the level 150 of liquid refrigerant 152 in closed space 148 in both the horizontal and vertical orientations of longitudinal axis 132. In a preferred embodiment, the configuration of the second tubular member 196 is such that the second end 200 thereof is at substantially the uppermost point of closed space 148 in either orientation. Thus, the length of the second tubular member 196 is selected such that the second end 200 reaches substantially to the first end cap 144, with bends or curves 202 and 204 (FIG. 6) being incorporated into the configuration of the second tubular member 196 to direct the second end 200 relatively close to an inner surface 206 of side wall 142. Inner surface 206 is on a side of tank 138 which is opposite to the side on which inner surface 184 is located. Inner surface 184 is on a portion of tank 138 which functions as the bottom of tank 138 when tank 138 is in the horizontal orientation of FIG. 6, and when tank 138 is in the vertical orientation of FIG. 7. Thus, end 200 of the second tubular member 196 will always be in a portion of tank 138 which functions as the top of tank 138, and thus well above the level 150 of liquid refrigerant 152 already in tank 138 when liquid refrigerant is discharged into tank 138 from condenser coil 26. The incoming refrigerant will thus not bubble through the liquid refrigerant 152 disposed at the portion of tank 138 which is functioning as the bottom of tank 138, regardless of whether longitudinal axis 138 is horizontally oriented, or vertically oriented.

The configuration of the first tubular member 178, which functions as a liquid refrigerant pick-up tube, is selected such that the second end 182 is well below the level 150 of liquid refrigerant 152 in closed space 148 in both the horizontal and vertical orientations of longitudinal axis 132. In a preferred embodiment, the configuration of the first tubular member 178 is such that the second end 182 thereof is at substantially the lowest point of closed space 148 in either of the horizontal or vertical orientations. Thus, the length of the first tubular member 178 is much shorter than that of the second tubular member 196 which introduces liquid refrigerant into closed space 148.

The length of the first tubular member 178 is selected such that the first tubular member 178 may be substantially continuously and smoothly curved, without crimping the cross section, such that the second end 182 is in closely spaced relation adjacent to inner surface 184. The smooth curve in the first tubular member 178 directs the second end 182 towards inner surface 184 of side wall 142. As hereinbefore stated, inner surface 184 is close to the portion of tank 138 which functions as the bottom portion of tank 138 when tank 138 has longitudinal axis 132 horizontally oriented, and when tank 138 has longitudinal axis 132 vertically oriented. Thus, when liquid refrigerant 152 is picked up by the first tubular member 178 for delivery to dryer 60 and liquid line 56, the liquid refrigerant 152 will always be drawn from substantially the lowest point of the supply level 150, to ensure that the liquid refrigerant 152 drawn from closed space 148 will contain a minimum of bubbles, regardless of whether longitudinal axis 132 is horizontally oriented, or vertically oriented.

We claim:

1. A refrigerant receiver tank assembly for receiving liquid refrigerant from a refrigerant condenser coil and supplying liquid refrigerant to a refrigerant evaporator coil, with the receiver tank assembly including a receiver tank and a receiver manifold which define a closed space for holding a supply level of liquid refrigerant, a refrigerant inlet flow path having an inlet opening accessible outside the closed space, and an outlet opening in the closed space, with the receiver manifold defining a refrigerant outlet flow path having an inlet opening in fluid flow communication with the closed space and first and second outlet openings, and including pick-up tube means in the closed space having a first end connected in fluid flow communication with the inlet opening of the refrigerant outlet flow path and a second end disposed in fluid flow communication with liquid refrigerant in the closed space, the improvement comprising:

electrically controlled valve means mounted on said receiver manifold in fluid flow communication with the refrigerant outlet flow path, said electrically controlled valve means selectively controlling flow of refrigerant to a predetermined outlet opening of the refrigerant outlet flow path.

2. The refrigerant receiver tank assembly of claim 1 including pressure switch means mounted on the receiver tank assembly, in pressure responsive relation with the closed space.

3. The refrigerant receiver tank assembly of claim 1 including first and second pressure switch means mounted on the receiver tank assembly, in pressure responsive relation with the closed space.

4. The refrigerant receiver tank assembly of claim 1 including manual valve means mounted on the receiver manifold, said manual valve means selectively controlling fluid flow through the refrigerant outlet flow path to both the first and second outlet openings.

5. The refrigerant receiver tank assembly of claim 1 including pressure relief means mounted on the receiver tank assembly, in pressure relation with the closed space.

6. The refrigerant receiver tank assembly of claim 1 including refrigerant sight glass means mounted on the receiver tank assembly.

7. The refrigerant receiver tank assembly of claim 1 wherein the receiver tank has first and second ends, and a longitudinal axis which extends between the first and second ends, with the receiver manifold being on the second end, and wherein the pick-up tube means has a configuration which places the second end of the pick-up tube means at substantially the lowest point of the enclosed space when the longitudinal axis of the receiver tank is oriented vertically and when the longitudinal axis of the receiver tank is mounted horizontally.

8. The refrigerant receiver tank assembly of claim 7 wherein the second end of the receiver tank is below the first end when the receiver tank is mounted with the longitudinal axis in a vertical position, and including additional tube means having a first end connected in fluid flow communication with the refrigerant inlet flow path and a second end in the closed space disposed above the supply level of liquid refrigerant in the closed space, when the longitudinal axis of the receiver tank is vertically oriented, and when the longitudinal axis of the receiver tank is horizontally oriented.

9. The refrigerant receiver tank assembly of claim 8 wherein the additional tube means has a configuration which places the second end of the additional tube means at substantially the highest point of the enclosed space when the longitudinal axis of the receiver tank is oriented vertically and when the longitudinal axis of the receiver tank is mounted horizontally.

10. The refrigerant receiver tank assembly of claim 1 including:

first and second pressure switch means mounted on the receiver tank, in pressure responsive relation with the closed space, manual valve means mounted on the receiver manifold, and disposed to selectively control fluid flow through the refrigerant outlet flow path to both the first and second outlets, pressure relief means mounted on the receiver tank, in pressure relation with the closed space, and refrigerant sight glass means mounted on the receiver tank.

* * * * *